United States Patent
Menzel

(10) Patent No.: US 11,246,036 B2
(45) Date of Patent: Feb. 8, 2022

(54) VEHICLE SYSTEM AND METHOD FOR VEHICLE-TO-X COMMUNICATION FOR EMISSION

(71) Applicant: Continental Teves AG & Co. oHG, Frankfurt am Main (DE)

(72) Inventor: Marc Menzel, Weimar (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 209 days.

(21) Appl. No.: 16/685,321

(22) Filed: Nov. 15, 2019

(65) Prior Publication Data
US 2020/0162921 A1  May 21, 2020

(30) Foreign Application Priority Data
Nov. 21, 2018  (DE) .................... 10 2018 219 961.2

(51) Int. Cl.
| | | |
|---|---|---|
| *H04L 29/06* | (2006.01) | |
| *H04L 29/08* | (2006.01) | |
| *H04W 12/106* | (2021.01) | |
| *H04W 4/40* | (2018.01) | |

(52) U.S. Cl.
CPC .......... *H04W 12/106* (2021.01); *H04W 4/40* (2018.02)

(58) Field of Classification Search
CPC .... H04W 12/106; H04W 4/40; H04L 9/3263; H04L 63/0823; H04L 2012/40273
USPC .......................................................... 726/4
See application file for complete search history.

(56) References Cited

U.S. PATENT DOCUMENTS

| | | | |
|---|---|---|---|
| 8,314,718 B2 | 11/2012 | Muthaiah et al. | |
| 8,909,927 B2 | 12/2014 | Falk et al. | |
| 2017/0214747 A1* | 7/2017 | Schulte | ................ H04W 76/40 |
| 2017/0365171 A1* | 12/2017 | Haran | ............. G08G 1/096791 |
| 2018/0220282 A1* | 8/2018 | Stahlin | .................... H04W 4/40 |
| 2018/0255562 A1* | 9/2018 | Cho | ........................ H04W 4/90 |
| 2018/0286229 A1* | 10/2018 | Szuprycinski | .......... H04W 4/44 |
| 2018/0288069 A1* | 10/2018 | Burchard | .................. H04L 9/30 |
| 2019/0152282 A1* | 5/2019 | Spengler | .................. B60D 1/62 |

(Continued)

FOREIGN PATENT DOCUMENTS

| | | |
|---|---|---|
| DE | 102007053255 A1 | 5/2009 |
| DE | 102010046843 A1 | 6/2011 |

(Continued)

OTHER PUBLICATIONS

German Search Report for German Application No. 10 2018 219 961.2, with partial translation, dated Aug. 22, 2019, 12 pages.

*Primary Examiner* — Haresh N Patel
(74) *Attorney, Agent, or Firm* — RatnerPrestia

(57) ABSTRACT

A vehicle system including a vehicle-to-X communication device for vehicle-to-X communication and a processing device for processing data to be sent by vehicle-to-X communication. The processing device is designed to transmit to the vehicle-to-X communication device data which are to be sent. The vehicle-to-X communication device is designed to generate an unsigned vehicle-to-X message using the transmitted data to be sent and to transmit the unsigned vehicle-to-X message to the processing device. The processing device is further designed to sign the transmitted vehicle-to-X message and to transmit the signed vehicle-to-X message to the vehicle-to-X communication device for emission. A corresponding method is also disclosed.

8 Claims, 2 Drawing Sheets

(56) References Cited

U.S. PATENT DOCUMENTS

| | | | | |
|---|---|---|---|---|
| 2019/0200228 | A1* | 6/2019 | Adrangi | H04W 12/0431 |
| 2019/0268376 | A1* | 8/2019 | Park | H04L 9/006 |
| 2019/0312738 | A1* | 10/2019 | Barrett | H04W 12/088 |
| 2020/0029268 | A1* | 1/2020 | Russell | H04W 48/04 |
| 2020/0106624 | A1* | 4/2020 | Russell | H04L 9/3239 |
| 2020/0178048 | A1* | 6/2020 | Kim | H04W 4/40 |
| 2020/0228988 | A1* | 7/2020 | Yang | H04L 9/0869 |
| 2021/0136572 | A1* | 5/2021 | Ingraham | H04W 12/069 |

FOREIGN PATENT DOCUMENTS

| | | |
|---|---|---|
| DE | 102014224202 A1 | 6/2016 |
| DE | 102015011920 A1 | 3/2017 |

* cited by examiner

VEHICLE SYSTEM AND METHOD FOR VEHICLE-TO-X COMMUNICATION FOR EMISSION

CROSS REFERENCE TO RELATED APPLICATIONS

This application claims priority to German Patent Application No. 10 2018 219 961.2, filed Nov. 21, 2018, the contents of such application being incorporated by reference herein.

FIELD OF THE INVENTION

The present invention relates to a vehicle system and to a corresponding method for vehicle-to-X communication.

BACKGROUND OF THE INVENTION

Vehicle-to-X communication is currently moving towards serial production. In particular, it is provided here that, in certain intervals or in the event of certain incidents, vehicles emit vehicle-to-X messages which comprise for example information about speed, position, route, acceleration or particular incidents such as for example breakdowns or emergency braking maneuvers. The currently applicable standards are IEEE802.11(p), IEEE1609, SAE 2735, SAE 2945 and ETSI ITS-G5, each incorporated by reference herein. Additionally, new 3GPP standards for Cellular V2X (C-V2X) are currently being drawn up.

A system which for example permits automated vehicle functions typically consists of multiple sensors, such as radar or cameras, and a central processing device. A vehicle-to-X communication device could be integrated into this system as an additional sensor. In order to ensure the necessary functional safety, all information passing from the transmitter or sensor to the processing device must be protected from changes or changes must be identified. Known techniques such as timestamps, CRC and monotonic message counters are frequently used for this purpose in order to identify changes in communication.

In the case of vehicle-to-X data, data transmission must be change-proof not only within the vehicle but also between the vehicles. To this end, ETSI and IEEE/SAE standards offer data security signing which, on the one hand, ensures with a probability of $1/2^{256}$ that messages have not been altered, be it intentionally or unintentionally, and, on the other hand, also ensures by means of an appended certificate that the message is trustworthy, see IEEE 1609.2.

Compliance with standards for ensuring functional safety, for example according to ASIL B or better, for data transmission in a vehicle communication network, for example Ethernet, may be achieved, for example, with appropriate AUTOSAR (AUTomotive Open System ARchitecture) software modules.

SUMMARY OF THE INVENTION

An aspect of the invention is a vehicle-to-X communication system which meets the requirements for a required safety integrity level and with which information security of data to be transmitted may be achieved in a way which requires minimal effort.

An aspect of the invention describes a vehicle system comprising:
a vehicle-to-X communication device for vehicle-to-X communication and
a processing device for processing data to be sent by means of vehicle-to-X communication, wherein
the processing device is designed to transmit to the vehicle-to-X communication device data which are to be sent and
the vehicle-to-X communication device is designed to generate a vehicle-to-X message without signature using the transmitted data to be sent and to transmit the vehicle-to-X message to the processing device and
the processing device is further designed to sign the transmitted vehicle-to-X message and to transmit the signed vehicle-to-X message to the vehicle-to-X communication device for emission.

An aspect of the invention is based on the concept of generating the signature for vehicle-to-X messages to be emitted by means of the processing device. In this way, it is possible to advantageously ensure a required safety integrity level of functional safety, e.g. ASIL B, for the entire vehicle system. The vehicle-to-X communication of the vehicle system may thus be developed as substantially non-safety-relevant, in particular ASIL QM, and, because less development effort is required and less expensive components may possibly be used, is correspondingly less costly than an alternative solution in which for example the vehicle-to-X communication device is designed to be ASIL B capable. Furthermore, there is no need according to an aspect of the invention to secure data transmission of the vehicle-to-X data in the vehicle.

According to a further development, the processing device is designed to perform a test on the transmitted, unsigned vehicle-to-X message as to whether the data to be emitted are included in the vehicle-to-X message. According to one embodiment, the processing device is designed to carry out the signing of the vehicle-to-X message only if the data to be emitted are included in the unsigned vehicle-to-X message.

The vehicle-to-X communication device conveniently has at least one antenna for emitting or receiving vehicle-to-X messages, wherein the vehicle-to-X communication device is designed to emit the signed vehicle-to-X message by means of the at least one antenna.

According to a further development, after transmission by the processing device and before emission of the signed vehicle-to-X message, the vehicle-to-X communication device makes no change to the signed vehicle-to-X message.

According to one embodiment of the invention, the vehicle-to-X communication device is designed to provide, in particular solely, one physical layer, one data link layer, in particular logical link control and/or media access control, one network layer and/or one transport layer for vehicle-to-X communication or vehicle-to-X messages to be emitted and/or received.

According to one embodiment of the invention, the processing device is designed to provide, in particular solely, one facilities layer and/or one application layer for processing the data to be emitted and/or received by means of vehicle-to-X communication.

The vehicle-to-X communication device is accordingly conveniently designed in such a manner as not to provide a facilities layer and/or application layer for processing the data to be emitted and/or received by means of vehicle-to-X communication.

According to one embodiment of the invention, the processing device is accordingly designed not to provide a physical layer, a data link layer, in particular logical link control and/or media access control, a network layer and/or a transport layer for vehicle-to-X communication.

The above-stated layers are designated in line with the nomenclature according to the OSI model or ETSI ITS-G5.

According to one embodiment, the vehicle-to-X communication device is designed to carry out a security check, in particular a certificate and plausibility check, of received vehicle-to-X messages and to transmit the vehicle-to-X messages to the processing device if the test is or is deemed to have been passed. Vehicle-to-X messages which do not pass the test are conveniently discarded. In this way, it is possible to ensure information security of received data and for the processing device to be relieved of computing tasks by messages which are not considered secure being discarded. In particular, the vehicle-to-X communication device is designed to transmit vehicle-to-X messages unchanged or substantially unchanged to the processing device.

According to a further development, the processing device is designed to perform a renewed security check of the received vehicle-to-X message transmitted by the vehicle-to-X communication device. It this way, it may advantageously be ensured that the content of the message has not been altered on transmission by the vehicle-to-X communication device to the processing device, for example by hardware or software faults or access. The data included in the vehicle-to-X messages may thereafter be processed by the processing device.

From an information security standpoint, the vehicle-to-X communication device is thus transparent, comparable to a data bus system, wherein information security of the data transmission means may be assumed to be a given.

An aspect of the invention further relates to a method for vehicle-to-X communication having the following steps:
- transmission of data to be sent by a processing device to a vehicle-to-X communication device,
- generation of an unsigned vehicle-to-X message by the vehicle-to-X communication device using the transmitted data to be sent,
- transmission of the unsigned vehicle-to-X message to the processing device,
- signature of the transmitted vehicle-to-X message by the processing device and
- transmission of the signed vehicle-to-X message to the vehicle-to-X communication device.

According to a further development, the processing device is designed to perform a test on the unsigned vehicle-to-X message transmitted by the vehicle-to-X communication device as to whether the data to be emitted are included in the vehicle-to-X message.

According to one embodiment, the processing device only carries out the signing of the vehicle-to-X message when the data to be emitted are included in the unsigned vehicle-to-X message transmitted by the vehicle-to-X communication device.

According to one embodiment, the vehicle-to-X communication device emits the signed vehicle-to-X message by means of at least one antenna.

The vehicle-to-X communication device conveniently carries out a security check, in particular a certificate and plausibility check, of received vehicle-to-X messages and transmits the vehicle-to-X messages according to a further development to the processing device, wherein the vehicle-to-X messages are transmitted in particular unaltered or substantially unaltered to the processing device.

According to a further development, the processing device performs a renewed security check of the received vehicle-to-X messages transmitted by the vehicle-to-X communication device.

According to a further aspect, the vehicle system according to the invention is set up to carry out a method according to at least one of the above embodiments.

In a further development of the stated vehicle system, the vehicle-to-X communication device and/or the processing device have in each case at least one memory means and in each case at least one processor. The stated method is here stored in the form of at least one computer program in memory means and the processors are provided for running the method when the computer program(s) are loaded into the processor memory means, wherein tasks may be correspondingly divided as a function of the device running them.

According to a further aspect of the invention, a computer program comprises program code means for performing all the steps of one of the stated methods when the computer program is run on a computer or one of the stated devices.

According to a further aspect of the invention, a computer program product contains a program code which is stored on a computer-readable data storage medium and which, when run on a data processing apparatus, performs one of the stated methods.

BRIEF DESCRIPTION OF THE DRAWINGS

Certain particularly advantageous configurations of aspects of the invention are indicated in the subclaims. Further preferred embodiments are also apparent from the following description of exemplary embodiments made with reference to figures, in which in schematic representation:

DETAILED DESCRIPTION OF THE PREFERRED EMBODIMENTS

Figure 1:
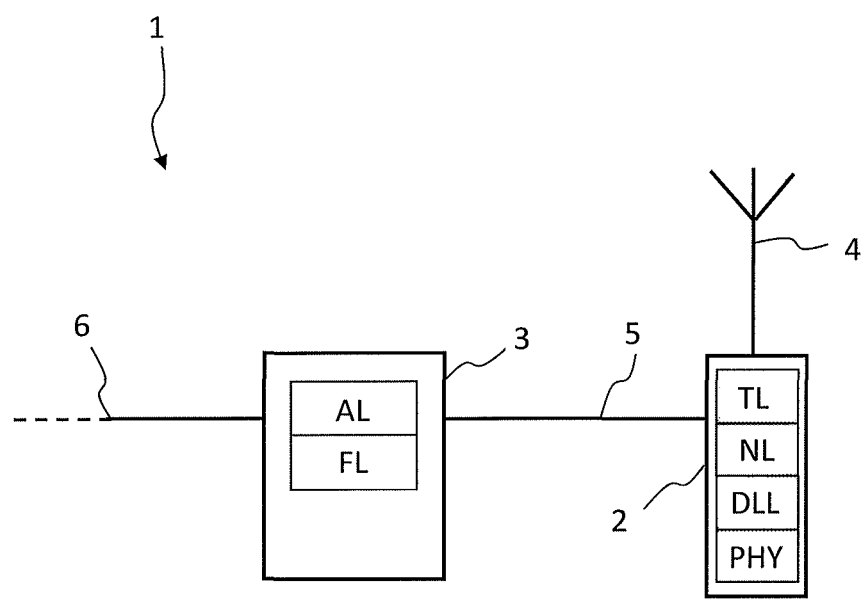
FIG. 1 shows an exemplary embodiment of a vehicle system according to an aspect of the invention.

FIG. 1 shows a vehicle system 1 with a vehicle-to-X communication device 2 for vehicle-to-X communication and a processing device 3 for processing data to be sent by means of vehicle-to-X communication, wherein the vehicle-to-X communication device 2 and the processing device 3 are suitably connected for data transmission by means of a data transmission means 5, for example a data bus, in particular CAN or Ethernet. The vehicle system further expediently comprises an antenna 4 for emitting and/or receiving vehicle-to-X messages. The processing device 3 may in particular additionally be connected for data transmission to an on-board data network 6. The processing device 3 is designed, initially to transmit data to be sent to the vehicle-to-X communication device 2, wherein the vehicle-to-X communication device 2 is designed to generate an unsigned vehicle-to-X message using the transmitted data to be sent and in turn to transmit the unsigned vehicle-to-X message to the processing device 3. The processing device 3 is further designed to sign the transmitted vehicle-to-X message and to transmit the signed vehicle-to-X message to the vehicle-to-X communication device 2 for emission by means of the antenna 4.

Tasks for the performance of vehicle-to-X communication by the vehicle-to-X communication system 1 are, for example, divided between the vehicle-to-X communication device 2 and the processing device 3 as follows. For vehicle-to-X communication, the vehicle-to-X communication device provides a physical layer PHY and a data link layer DLL, wherein logical link control and media access control sublayers, not shown in FIG. 1, may be provided in the data link layer DLL, a network layer NL and a transport layer TL. The processing device, on the other hand, provides a facilities layer FL and an application layer AL for processing the data to be emitted or received by means of vehicle-to-X communication.

Figure 2:
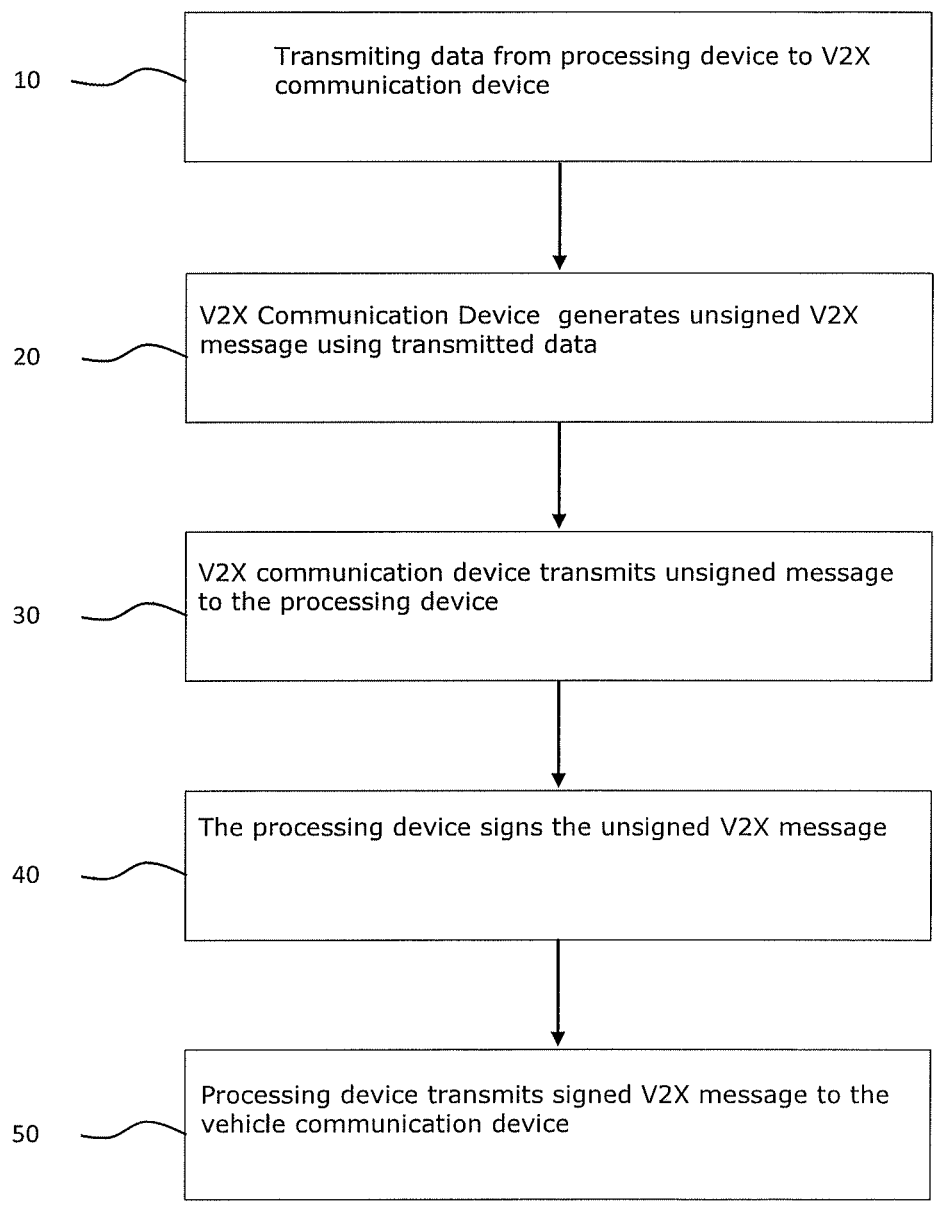
FIG. 2 shows an exemplary embodiment of the method according to an aspect of the invention.

FIG. 2 shows an exemplary embodiment of a method according to an aspect of the invention, wherein in a first step 10 data to be sent is transmitted by a processing device 3 to a vehicle-to-X communication device. In a second step 20, the vehicle-to-X communication device 2 generates an unsigned vehicle-to-X message using the transmitted data to be sent and then in a third step 30 transmits it to the processing device. In a fourth step 40, the processing device 3 signs the vehicle-to-X message transmitted by the vehicle-to-X communication device and, in a fifth step 50, transmits the signed vehicle-to-X message to the vehicle-to-X communication device.

If it turns out, over the course of the procedure, that a feature or a group of features is not absolutely necessary, then the applicant already requests now a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood to also be covered by the disclosure of this application.

It should also be pointed out that configurations, features and variants of aspects of the invention, which are described in the various embodiments or exemplary embodiments and/or shown in the figures, may be combined together as desired. Individual or multiple features are interchangeable as desired. Resultant combinations of features should be understood to also be covered by the disclosure of this application.

Back-references in dependent claims should not be understood to amount to renouncing independent objective protection for the features of the back-referenced subclaims. These features may also be combined with other features as desired.

Features which are only disclosed in the description or features which are disclosed in the description or in a claim only in conjunction with other features may in principle independently have significance which is essential to an aspect of the invention. They may therefore also be included individually in claims for the purpose of differentiation from the prior art.

In general, it should be noted that vehicle-to-X communication is in particular taken to mean direct communication between vehicles and/or between vehicles and infrastructure apparatuses. Therefore, it may be, for example, vehicle-to-vehicle communication, vehicle-to-infrastructure or vehicle-to-road user communication in general. If, in the context of this application, reference is made to communication between vehicles, this may in principle proceed for example in the context of vehicle-to-vehicle communication, which typically proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4. Vehicle-to-X communication may also be described as C2X communication. The sub-categories may be described as C2C (car-to-car) or C2I (car-to-infrastructure). The solution according to an aspect of the invention is not limited to the stated communication technologies. For example, an aspect of the invention explicitly does not exclude vehicle-to-X communication with mediation, in particular via a mobile radio network.

The invention claimed is:

1. A vehicle system within a vehicle, the vehicle system comprising:
   a vehicle-to-X communication device within the vehicle, the vehicle-to-X communication device including a transceiver for vehicle-to-X communication external to the vehicle via an antenna, the vehicle-to-X communication device operating at an automotive safety integrity level less than ASIL B; and
   a processor within the vehicle separate from the vehicle-to-X communication device, the processor for processing data to be transmitted external to the vehicle via the vehicle-to-X communication, the processor operating at an automotive safety integrity level greater than or equal to Automotive Safety Integrity Level (ASIL) B, wherein
   the processor is designed to send the data to the vehicle-to-X communication device, wherein
   the vehicle-to-X communication device is designed to generate an unsigned vehicle-to-X message using the data, and to send the unsigned vehicle-to-X message to the processor, wherein
   the processor is further designed to sign the vehicle-to-X message, and to send the signed vehicle-to-X message to the vehicle-to-X communication device, and wherein
   the vehicle-to-X communication device is further designed to transmit the signed vehicle-to-X message external to the vehicle via the antenna.

2. The vehicle system according to claim 1, wherein the processor is designed to carry out the signing of the vehicle-to-X message only if the data to be transmitted are included in the unsigned vehicle-to-X message.

3. The vehicle system according to claim 1, wherein the vehicle-to-X communication device is designed to make no change to the signed vehicle-to-X message before transmitting the signed vehicle-to-X message.

4. The vehicle system according to claim 1, wherein the vehicle-to-X communication device is designed to provide a physical layer (PHY), a data link layer (DLL), a network layer (NL) and/or a transport layer (TL) for vehicle-to-X communication.

5. The vehicle system according to claim 1, wherein the processor is designed to provide a facilities layer (FL) and/or an application layer (AL) for processing the data to be transmitted and/or received by vehicle-to-X communication.

6. The vehicle system according to claim 1, wherein the vehicle-to-X communication device is designed to perform a security check of received vehicle-to-X messages and to transmit the vehicle-to-X messages to the processor if the test is deemed to have been passed.

7. The vehicle system according to claim 6, wherein the processor is designed to perform a renewed security check of the received vehicle-to-X messages transmitted by the vehicle-to-X communication device.

8. A method for performing vehicle-to-X communication in a vehicle, the method comprising:
   sending, by a processor within the vehicle, data to a separate vehicle-to-X communication device within the vehicle, the vehicle-to-X communication device including a transceiver for vehicle-to-X communication external to the vehicle via an antenna, the processor operating at an automotive safety integrity level greater than or equal to ASIL B, and the vehicle-to-X communication device operating at an automotive safety integrity level less than Automotive Safety Integrity Level (ASIL) B;

generating, by the vehicle-to-X communication device, an unsigned vehicle-to-X message using the and sending, by the vehicle-to-X communication device, the unsigned vehicle-to-X message to the processor;

signing, by the processor, the vehicle-to-X message, and sending, by the processor, the signed vehicle-to-X message to the vehicle-to-X communication device; and transmitting, by the vehicle-to-X communication device, the signed vehicle-to-X message external to the vehicle via the antenna.

* * * * *